(12) United States Patent
Nakache et al.

(10) Patent No.: US 7,227,903 B2
(45) Date of Patent: Jun. 5, 2007

(54) OFDM TRANSMITTER FOR GENERATING FSK MODULATED SIGNALS

(75) Inventors: Yves-Paul Nakache, Cambridge, MA (US); Andreas Molisch, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 741 days.

(21) Appl. No.: 10/624,690

(22) Filed: Jul. 22, 2003

(65) Prior Publication Data

US 2005/0018783 A1    Jan. 27, 2005

(51) Int. Cl.
*H04K 1/10*    (2006.01)
(52) U.S. Cl. ...................................... 375/260
(58) Field of Classification Search ................ 375/260, 375/295, 298, 377; 370/206, 320, 342, 210
See application file for complete search history.

(56) References Cited

U.S. PATENT DOCUMENTS 7,002,904 B2 * 2/2006 Jung ........................... 370/210

2002/0006167 A1 * 1/2002 McFarland .................. 375/260
2004/0233836 A1 * 11/2004 Sumasu et al. ............. 370/206
2006/0184862 A1 * 8/2006 Kim et al. .................. 714/784

OTHER PUBLICATIONS

May et al., "*Orthogonal Frequency Division Multiplexing,*" Part IV, Molisch (ed.), Wideband Wireless Digital Communications, Prentice-Hall, pp. 309-385, 2001.
van Nee et al., "*OFDM for Wireless Multimedia Communications,*" Artech House, pp. 33-39, Jan. 2000.

* cited by examiner

*Primary Examiner*—Khai Tran
(74) *Attorney, Agent, or Firm*—Dirk Brinkman; Clifton D. Mueller; Gene V. Vinokur

(57) ABSTRACT

An OFDM transmitter generates FSK symbols in a communications network. Complex values representing OFDM tones are partitioned in groups. A distinct energy is assigned to each group of complex values. An OFDM modulator is applied to the complex values having the assigned distinct energies to generate FSK symbols corresponding to the groups, and the FSK symbols are transmitted serially.

7 Claims, 4 Drawing Sheets

OFDM TRANSMITTER FOR GENERATING FSK MODULATED SIGNALS

RELATED APPLICATION

This application is related to U.S. patent application Ser. No. 10/624,771, "OFDM Receiver for Detecting FSK Modulated Signals" filed by Nakache and Molisch on Jul. 22, 2003, incorporated herein by reference.

FIELD OF THE INVENTION

The present invention relates generally to wireless communications, and more particularly to transmitting OFDM signals in ultra wide bandwidth communication systems.

BACKGROUND OF THE INVENTION

A number of possible modulation/multiple access schemes are being considered for a physical layer of an ultra wide bandwidth (UWB) communications system by the IEEE 802.15.3 standards working group. One is multiband orthogonal frequency division multiplexing (OFDM).

As shown generally in FIG. 1, OFDM transmitters send data (OFDM symbols or 'blocks') 101 in parallel on K carrier frequencies ("tones") 102. Note that for multiband OFDM, all of the carrier frequencies are within one band. For example, in one proposal to the IEEE 802.15 standards working group, the 128 tones are spaced approximately 4 MHz apart, and have a duration of approximately 300 ns. Each of the tones is quaternary phase shift keying (QPSK) modulated.

In practice, OFDM signals are not generated by multiple, separately modulated, local oscillators. Instead, an inverse fast Fourier transform (IFFT) is applied to the symbols to be transmitted as individual tones, e.g., see May et al., "Orthogonal Frequency Division Multiplexing," Part IV, Molisch (ed.), Wideband Wireless Digital Communications, Prentice-Hall, pp. 309–385, 2001. The IFFT is typically implemented as a 'butterfly' structure, see, van Nee et al., "OFDM for Wireless Multimedia Communications," Artech House, pp. 33–39, January 2000.

Such a transceiver is relatively complex. However, for some applications, the complexity of OFDM signaling may not be required at a receiver.

An alternative, less complex form of signaling is multiband frequency shift keying (FSK) within each band. Although FSK has usually a lower data rate, and perhaps, a lower quality, FSK signaling is much simpler to implement, reducing the cost of the receiver.

However, providing FSK signaling as an alternative signaling mode has drawbacks for a standardized implementation. Now, the transmitter is required to be able to transmit both high complexity OFDM signals and low-complexity FSK signals. That is, the transmitter must include two different types of modulators, i.e., both OFDM and FSK. This increases the cost of the transmitter.

It is desired to provide an OFDM transmitter that is able to transmit FSK signals without substantially increasing the cost.

SUMMARY OF THE INVENTION

An OFDM transmitter is capable to transmit both OFDM and FSK signals. Complex values representing OFDM tones are partitioned in groups. A distinct energy is assigned to each group of complex values. An OFDM modulator is applied to the complex values having the assigned distinct energies to generate FSK symbols corresponding to the groups, and the FSK symbols are transmitted serially.

DETAILED DESCRIPTION OF THE PREFERRED EMBODIMENT

The invention provides an OFDM transmitter that can generate multiband FSK symbols. The transmitted FSK symbols can be detected by a low-complexity, low cost FSK receiver.

In other words, the invention enables a multiband OFDM transmitter to send multiband FSK symbols.

Figure 1:
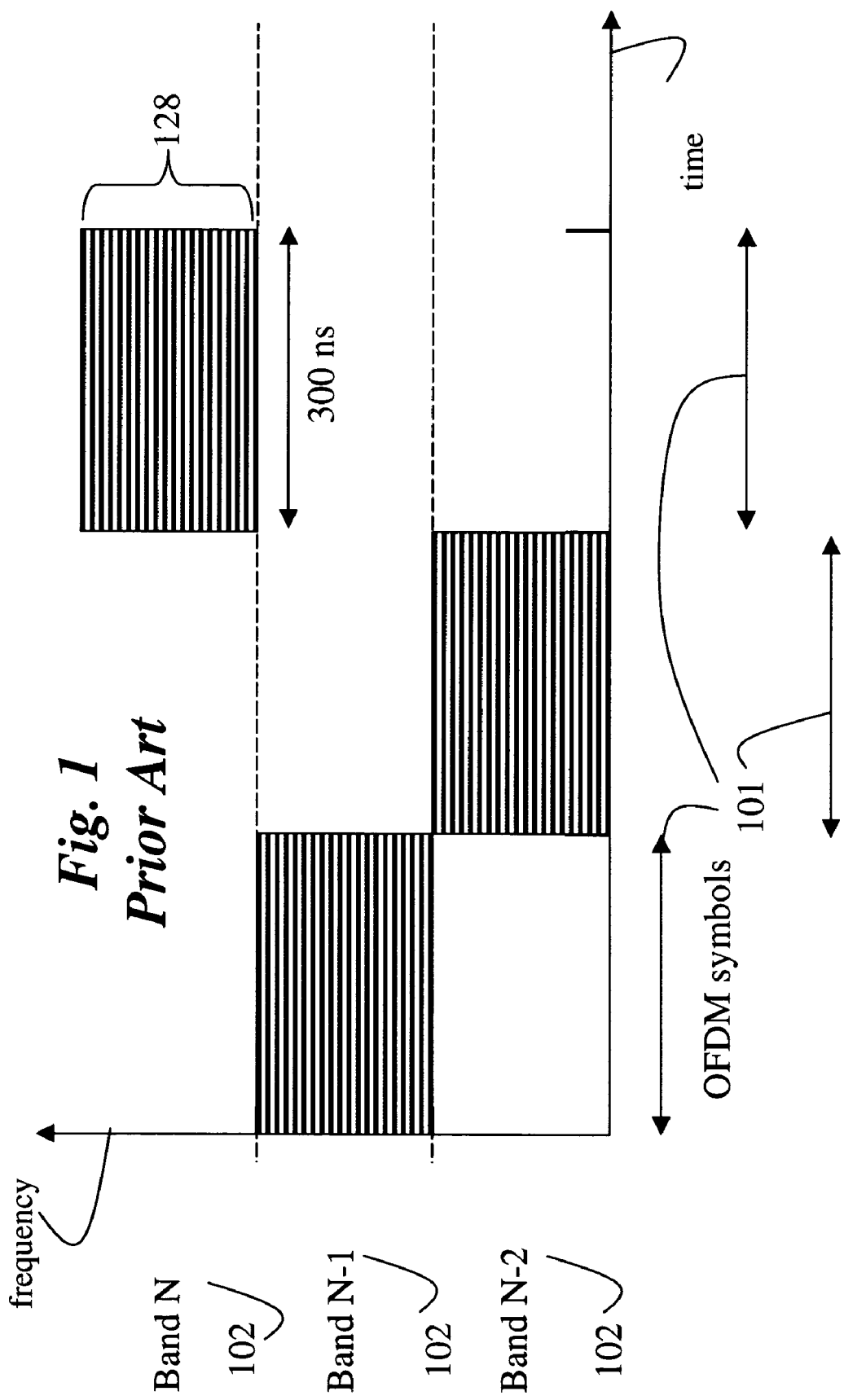
FIG. 1 is a time-frequency representation of a prior art multiband OFDM signal.
Figure 2:
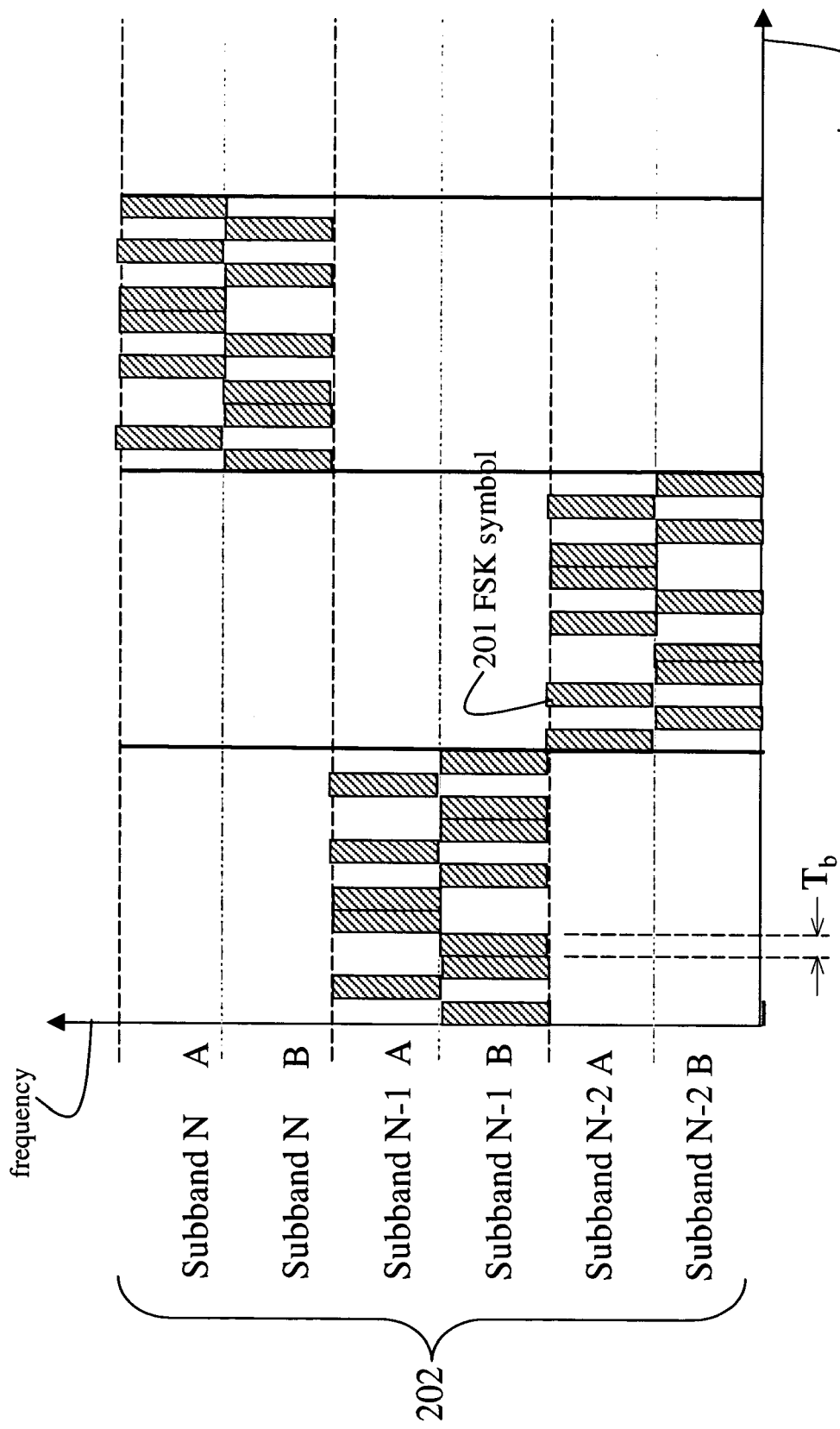
FIG. 2 is a time-frequency representation of multiband FSK symbols generated by the transmitter according to the invention.

In the preferred embodiment, as shown in FIG. 2, different groups of FSK symbols 201 are transmitted in different bands of a large frequency range (bands N, N-1, N-2) 202. The number of symbols in each group can be one or larger. In the preferred embodiment, a duration $T_b$ of an FSK symbol is smaller or equal to the OFDM symbol duration for which the transmitter is designed.

Figure 3:
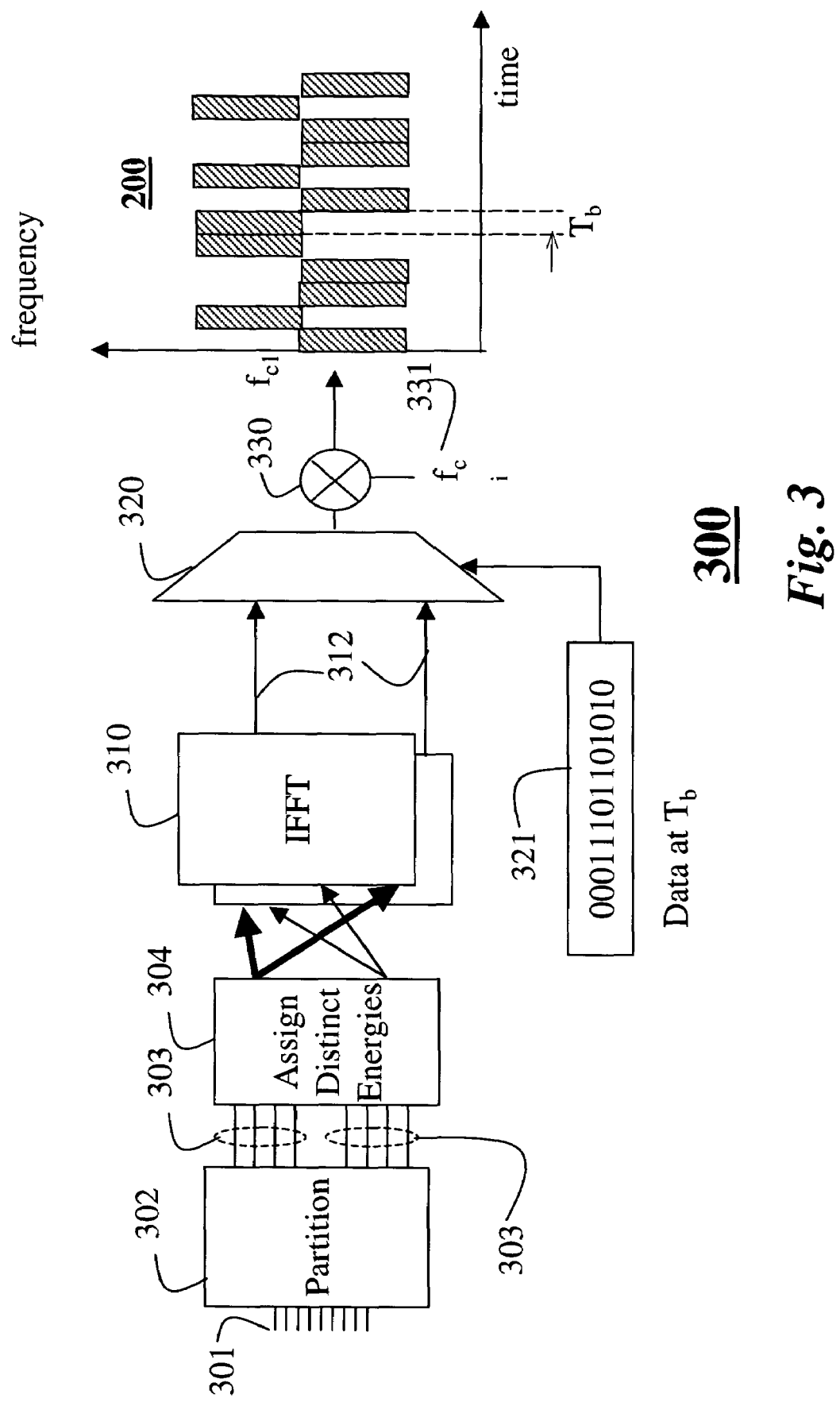
FIG. 3 is a block diagram of a multiband OFDM transmitter generating multiband FSK symbols using parallel IFFT according to the invention.

As shown in FIG. 3, the OFDM transmitter 300 according to the invention exploits the characteristics of multiple inverse fast Fourier transform (IFFT) 310 operating in parallel.

An input signal 301, in the form of N complex values or bands, e.g., 128, is partitioned 302 into M, e.g., two, groups of bands 303. The grouping of the N can be arbitrary, e.g., disjoint, interleaved, etc. Distinct energies are assigned 304 to each group of complex values.

The number of parallel IFFTs 310 can be small. Multiple parallel, small size IFFTs are available as part of the butterfly structure which is used for a large size IFFT. In this embodiment, the parallel IFFTs 310 generate M continuous waveforms 312 with time invariant spectral characteristics. Each of these waveforms fills $1/M^{th}$ of each band.

As shown in FIG. 2, the first waveform fills subband A, and the second waveform fills subband B. A switch 320 is controlled by transmit data 321. The switch determines which of the waveforms is sent during each time interval of length $T_b$. Band A can be used to code logical 0, and band B codes logical 1. This implementation imposes no restriction on the FSK symbol duration.

FIG. 3 shows that the duration of the waveforms 200 in the M bands can be controlled by switches 320 to modulate the signal at a different symbol rate before the up conversion and frequency hopping according 330 to a chip rate ($f_{ci}$) 331.

Figure 4:
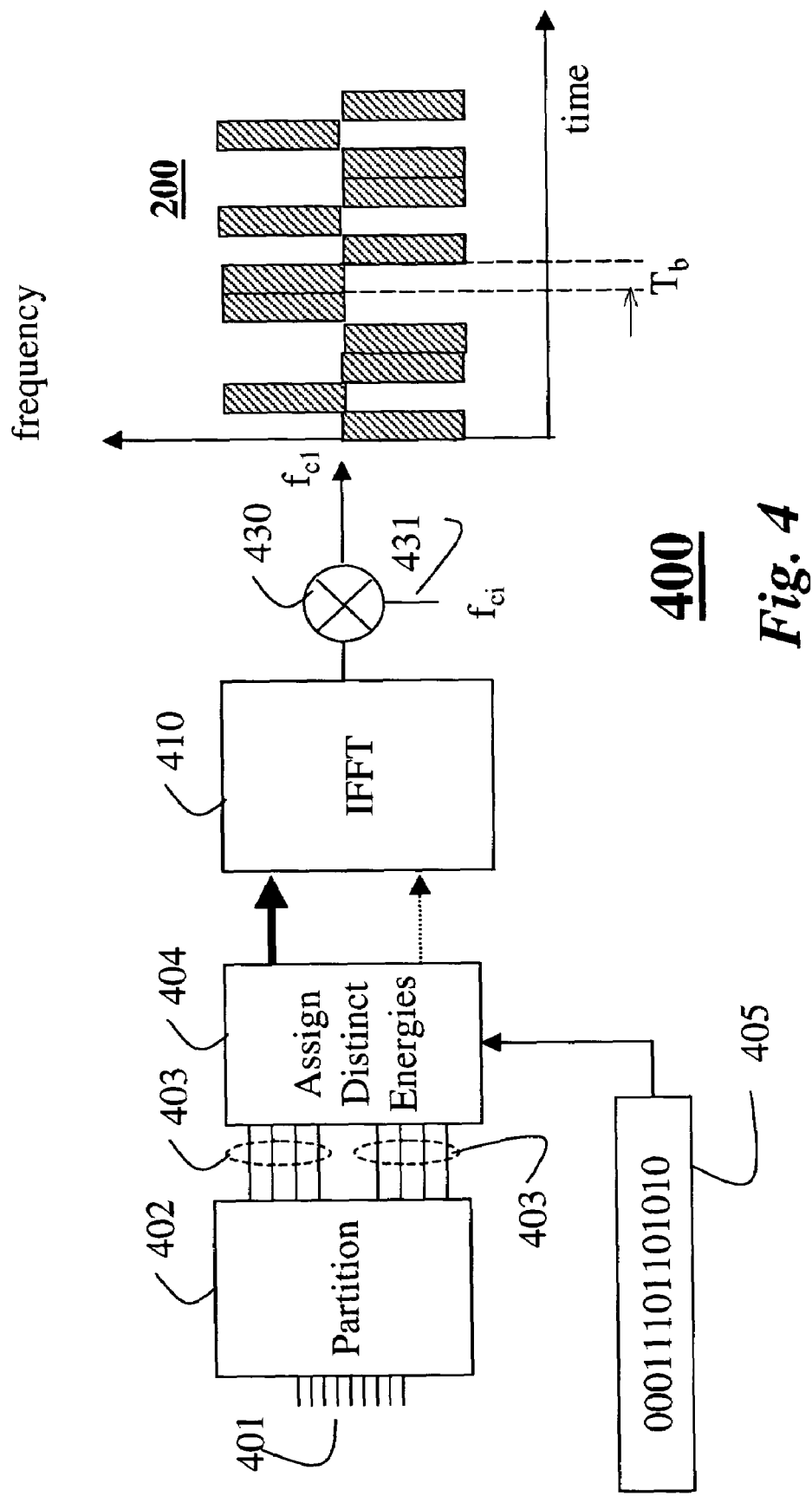
FIG. 4 is a block diagram of a multiband OFDM transmitter generating multiband FSK symbols using a single IFFT according to the invention.

FIG. 4 shows an alternative embodiment 400. As before, an input signal 401 is partitioned 402 in groups 403 of bands. Distinct energies are assigned 404 to each group of complex values according to transmit data 405. Here, one IFFT 410 is used to generate a sequence of time-limited waveforms of duration $T_b$. 201. The duration $T_b$ depends on a size of the IFFT and a signal bandwidth. Consequently, the duration depends on a spacing of the OFDM tones, which is equal to a ratio of the signal bandwidth over the size of the IFFT 410. The IFFT 410 is followed by up conversion and frequency hopping 430.

The FSK symbols 200 can be a single tone during an OFDM block, while the amplitude of all other tones is zero. However, such a signal, although useful, may not be compliant with all regulatory agencies that specify the use of the radio frequency spectrum. This solution requires one detector to acquire the energy for each possible tone.

If there are several tones in each subband and the channel characteristics are known at the transmitter, a fine structure can be imposed to compensate distortions by the channel.

As a further refinement of the invention, it is possible to obtain a combination of amplitude and FSK modulations using different amplitudes at the outputs of the IFFTs. This can increase the data rate without modifying a clock of the IFFT.

FIG. 2 shows a signal example where a dwell time in each band is constant and fixed by the tone spacing. However, this is not a requirement. For any given FSK symbol duration, the dwell time can be an arbitrary integer multiple of the FSK symbol duration before changing to a different frequency band.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating FSK symbols in a communications network, comprising:

partitioning a plurality of complex values representing OFDM tones into a plurality of groups;

assigning a distinct energy to each group of complex values;

applying an OFDM modulator to the plurality of complex values having the assigned distinct energies to generate FSK symbols corresponding to the plurality of groups, in which a duration of each FSK symbol is smaller or equal to a duration of an OFDM symbol for which the OFDM modulator is designed; and transmitting the FSK symbols serially.

2. The method of claim 1, in which the OFDM modulator includes a single IEFT, and the distinct energies are assigned to each group according to a data stream.

3. The method of claim 1, in which the OFDM modulator includes a plurality of IFFTs operating in parallel, and outputs of the plurality of IEFTs are selected according to a data stream.

4. The method of claim 1, in which there are 128 tones and two groups.

5. The method of claim 2, in which a duration of each FSK symbol depends on a spacing of the tones.

6. The method of claim 1, further comprising:

detecting the FSK symbols in a OFDM receiver.

7. An OFDM transmitter for generating FSK symbols in a communications network, comprising:

means for partitioning a plurality of complex values representing OFDM tones into a plurality of groups;

means for assigning a distinct energy to each group of complex values;

an OFDM modulator configured to apply OFDM modulation to the plurality of complex values having the assigned distinct energies to generate FSK symbols corresponding to the plurality of groups, in which a duration of each FSK symbol is smaller or equal to a duration of an OFDM symbol for which the OFDM modulator is designed; and means for transmitting the FSK symbols serially.

* * * * *